United States Patent Office 2,963,373
Patented Dec. 6, 1960

2,963,373

ICINGS AND METHOD OF PREPARING THEM AND COLD-WATER SOLUBLE AGAR AND CARRAGEEN GUMS FOR SAID ICINGS

Anthony Monti, Brooklyn, N.Y., and Nathan R. Pike, Glenville, Conn., assignors to American Molasses Company, New York, N.Y., a corporation of New York No Drawing. Filed Nov. 17, 1958, Ser. No. 774,128

23 Claims. (Cl. 99—131)

This invention relates to icings which, as is well known, consist basically of sugar and water to which may be added chocolate, cocoa, shortening, milk powder, fruit, nuts, flavors, etc. and more particularly to a stabilized icing and to processes of producing such stabilized icings.

In this specification, where reference is made to "solution," "dissolves" and words of similar import, it will be understood these expressions are used in their commonly accepted sense in this art to include the formation of colloidal solutions in which the gum particles of colloidal size are uniformly suspended in the water.

Agar is derived from a species of seaweed that is native to the shores of Japan and Korea. It is used commercially as a stabilizer, thickener or emulsifier. It has wide use in the food industry for such purposes as stabilization of icings and in the preparation of jellies and candy jellies. It is believed to be a calcium polygalactopyranose complex. Carrageen is a well known gum used along with or as a substitute for agar and is obtained by extraction from Irish Moss (Chondrus Crispus or Gigartina Stellata).

As is well known, icings consist basically of sugar and water, to which may be added chocolate, cocoa, shortening, milk powder, fruits, nuts, flavors, etc. The water is essential to render the icing palatable and of proper consistency for spreading. In many cases, the water dissolves some of the sugar forming a thin syrup from which the sugar recrystallizes as the icing stands; the recrystallized sugar exerts a binding or cementing action. The proper amount of water for any particular icing is, therefore, very important.

Once an icing has been spread on cakes or rolls, its normal tendency is to lose moisture by evaporation. This causes the icing to become dry, hard, stale, and much less palatable. To minimize this moisture loss, it is the practice of many bakers to wrap the goods in waxed paper, moisture-vapor-proof cellophane or other such wrappings. While these wrappers serve to extend the shelf-life of the product by preventing the evaporation of moisture, they give rise to another equally serious problem, namely, the air inside the sealed package absorbs water vapor from the icing or the baked product until its water vapor pressure is in equilibrium with the ambient temperature conditions. When the temperature drops, moisture condenses on the icing in the form of a film of water from the saturated air in contact with the surface of the icing. The water content of the icing is thus thrown out of balance and the water thus condensed on the surface of the icing dissolves more sugar, causing the icing to become soft, sticky and runny. Frequently, the icing adheres to the wrapper and pulls away from the cakes or rolls or runs off into puddles, and in extreme cases becomes so thin that it disappears completely by soaking into the baked goods.

To correct these undesirable conditions, stabilizers are added having the property of combining with water in the form of a gel so that the water is no longer free to evaporate, condense or dissolve additional sugar. Such gels also tend to protect the icing from damage caused by water vapor emanating from the cakes, rolls or other baked goods to which the icing is applied. Stabilized icings have the further advantage of setting faster after spreading, thus permitting more immediate wrapping.

The use of agar and carrageen gum as stabilizers for icings has long been known. However, in order to get agar into condition so that it will gel, it must first be mixed with water and boiled. Many bakers object to this boiling operation because it is time-consuming and sometimes hazardous. Other bakers lack proper equipment for boiling the relatively large amount of water, approximately 50 parts for each part of agar, required in order to obtain the desired agar gel.

In the case of carrageen, in order to obtain a gel, it is necessary to heat the carrageen in water to a temperature of at least 170° F. for a period of 20 to 30 minutes. This is objectionable for substantially the same reasons stated above in connection with the handling of agar. The acidulation of the carrageen gum reduces, within limits, the temperature and time of treatment to producet a gel.

In accordance with the present invention, agar or carrageen is mixed with water in the ratio of approximately 30 to 50 parts of water per part of gum. To this mixture is added a water-carrier or gelatinizing additive, hereinafter described, in amount of from ½ part to 250 parts per part of gum, and the resultant mixture heated to a temperature of from 170° to 350° F. for from about 10 second to 18 hours, to produce a solution which is thereafter dried, the dried product cooled and the cooled product pulverized to produce, surprisingly and unexpectedly, a modified agar or carrageen gum which when added to water at room temperature produces a solution which reasonably promptly forms a gel satisfactory for stabilizing icings and for other purposes, e.g. thickeners, stabilizers or emulsifiers.

The modified agar or carrageen may be used as such or may be mixed with additional flour, sugar, salt, etc., to provide a mixture for the baker which can be used to stabilize the icing and at the same time incorporate therein other desired constituents. When mixed with other constituents such as sugar, flour or salt, these other constituents, desirably, are added to the modified gum in desired amount prior to the pulverization treatment, and the resultant mixture pulverized. In this way, uniform distribution of the additional constituents throughout the gum particles is obtained.

Within the ranges above mentioned, the longer the heating time the lower the temperature; conversely, the higher the temperature the shorter the heating time. Also, in general, the greater the amount of additive employed the longer the heating time; preferably with larger amounts of additives within the ranges above given higher temperatures and longer heating times are used as compared with the incorporation of smaller amounts of additives.

Preferred additives are flour (wheat, tapioca, sago, rye or other baking flour) employed in amounts of from .75 to 50 parts per part of gum, preferably 1 part flour per part of gum, sugar in amount of from 1 to 250 parts per part of gum, preferably about 50 parts of sugar per part of gum, mixtures of sugar and flour, using from .5 to 200 parts of sugar and .5 to 50 parts of flour per part of gum, preferably 25 parts of each of sugar and flour per part of gum. Other additives which have been found effective are the inorganic salts, sodium chloride in amount of from 1 to 20 parts per part of gum, preferably 10 parts per part of gum, sodium citrate, calcium carbonate, calcium sulphate and tri-calcium phosphate, each employed in amount of from 1 to 50 parts per part of gum, preferably 25 parts per part of gum.

The water-carrying or gelatinizing additive may be added to the water gum mixture all at one time or in increments. Optimum results are obtained by heating the gum and water preferably to boiling and adding the water-carrying additive in increments with sufficient time intervals between additions to allow for equalization of solute concentration inside and outside each particle of gum. The presence of the additive during the drying causes the gum particles to remain extended, permitting easy penetration of water and accounting, in part at least, for the solubility of the modified gum in water at room temperature.

The mixture of gum, water and additive in the proportion of 30 to 50 parts water per part of gum and employing an amount of additive near the minimum amount in the range above given, is heated to a temperature of 170° F., preferably to its boiling point, to produce the solution which is later dried. When employing amounts of additive near the maximum amount within the ranges above given, the resultant mixture may be heated to a temperature as high as 350° F. The time of heat treatment of mixtures containing minimum or amounts near minimum of the additive is preferably about 30 minutes when a temperature of about 170° F. is employed, about 1 minute when heated to the boiling point, and about 10 seconds when heated to a temperature as high as 350° F. Operating with maximum or near maximum amounts of additive within the ranges above indicated, the time of treatment is about 18 hours when operating at the lower temperature of about 170° F., about 30 minutes when heating to the boiling point of the mixture, and approximately 1 minute when heating to a temperature of about 350° F. With preferred amounts of additive above indicated, the time of heating of the mixture is about 30 minutes when heating to the lower temperature of about 170° F., 1 minute when boiling the mixture, and 10 seconds when the mixture is heated to a temperature of 350° F., i.e., the mixture is maintained at this temperature for about 10 seconds.

The resultant solution is dried in any known manner. For example, the solution may be drum-dried, spray-dried or dried by conventional pan-drying techniques. As indicated, the dried product is pulverized to produce the final product which, surprisingly, when added to water at room temperature, forms a solution which gels reasonably promptly; the modified gum is eminently satisfactory for use in stablizing icings. As noted, it may be used as such or mixed with other constituents of the icing such as sugar, flour, salt, etc.

The explanation for the capability of the modified gum to dissolve in water at room temperature, or even lower temperature (i.e., from about 5° C. to 20° C. to 25° C.), the resultant solution on standing forming a gel reasonably promptly, is not fully understood. It is believed the pre-treatment hereinabove described expands the agar or carrageen particles causing them to be penetrated by the additive particles. When the pulverized final product is added to water, the additive particles provide passageways along which water penetrates readily into the gum particles and causes them to go into colloidal solution. Moreover, the mixture, unlike agar or carrageen alone, when added to water, is free or substantially free of gummy surface films. Such films form when agar alone or carrageen alone is added to cold water and prevent these gums from going into solution. It will be understood this invention is not to be limited to the above explanation, which is advanced to facilitate a better understanding of the invention.

The pulverized product is added to water in the ratio of from 1 to 100 parts water per part of modified gum. The exact amount of water used will depend on the desired consistency of the gel. This addition is performed by the baker when producing his icing, the gel formed stabilizes the icing, as hereinabove described.

Examples in the production of modified gums which can be used in the production of icings embodying this invention are as follows:

Example I 2 pounds of agar and 1½ pounds of baking flour were thoroughly mixed and added to 150 pounds of water. The resultant mixture was boiled for 3 minutes producing a colloidal solution which was passed over a drum drier to produce a product having a moisture content of less than 1%. The resultant modified agar was pulverized. The pulverized product when added to water at room temperature promptly resulted in an excellent agar gel.

Example II 2 pounds of agar, 1½ pounds of baking flour, 20 pounds of sugar were thoroughly mixed and added to 150 pounds of water. The mixture was boiled for 3 minutes. The solution was then drum-dried to a moisture content of less than 1%. The dried product was pulverized. Upon addition of this product to water at room temperature, an excellent agar gel resulted immediately.

Example III 4 parts agar and 4 parts tri-calcium phosphate were added to 200 parts of water and the mixture boiled. 22 parts of tri-calcium phosphate were then added and the mass dried on a drum drier, the dried product cooled and pulverized. Upon addition of the pulverized product to water at room temperature, an excellent agar gel resulted within 2 minutes.

Example IV

This example differed from Example III in the use of calcium sulphate instead of tri-calcium phosphate. Otherwise the conditions were the same and the amount of calcium sulphate used was the same as the amount of tri-calcium phosphate in Example III. The pulverized product produced an excellent agar gel within 2 minutes of addition to water at room temperature.

Example V

This example differed from Example III in the use of calcium carbonate instead of tri-calcium phosphate. Otherwise the conditions were the same and the amount of calcium carbonate used was the same as the amount of tri-calcium phosphate in Example III. The resultant modified agar upon addition to water at room temperature produced an excellent gel in 10 minutes.

Example VI

This example differed from Example III in the use of sodium citrate instead of tri-calcium phosphate. Otherwise the conditions were the same and the amount of sodium citrate used was the same as the amount of tri-calcium phosphate in Example III. The modified agar produced was equally good in producing satisfactory gels on addition to water at room temperature.

Example VII

This example differed from Example III in the use of sodium chloride instead of tri-calcium phosphate. Otherwise the conditions were the same and the amount of sodium chloride used was the same as the amount of tri-calcium phosphate in Example III. The results obtained were comparable.

Example VIII 4 parts agar and 3 parts flour were boiled in 200 parts of water, dried on a drum drier, the dried product cooled and the cooled product pulverized. The resultant product, upon addition to water at room temperature, produced an excellent agar gel within 2 minutes.

Example IX

This example differed from the proceding example in the use of 70 parts sugar instead of 3 parts flour. The conditions were otherwise the same and the results were the same.

Example X 4 parts agar, 3 parts flour, 70 parts sugar were added to 200 parts water and the mixture boiled. The resultant colloidal solution was dried on a drum drier, the dried product cooled and the cooled product pulverized. The resultant modified agar, upon addition to water at room temperature, produced a gel within 2 minutes.

Example XI 4 parts carrageen and 70 parts sugar were added to 200 parts water, the mixture boiled, the resultant colloidal solution dried on a drum drier, the dried product cooled and the cooled product pulverized. The resultant modified carrageen, upon addition to water at room temperature, formed a gel within 2 minutes.

Example XII 2 pounds of agar were added to 98 pounds of water and the mixture boiled. 10 pounds of sugar were then added while the mixture was maintained at 170° F. for 15 minutes. Thereafter another 10 pounds of sugar were added together with enough water to replace that lost due to evaporation. The addition of 10 pounds of sugar every 15 minutes was repeated five times until a total of 50 pounds of sugar had been added, the temperature of the mixture throughout this period being maintained at 170° F. The resultant solution was then dried to a moisture content of less than 1%, the dried product cooled and the cooled product powdered. Upon addition to water, a satisfactory gel formed immediately.

In all of the above examples, the amount of water to which the modified gum was added was from 5 to 25 parts of water per part of modified gum; most of the examples involved the use of 8 parts water per part of modified gum.

It will be noted that the present invention provides modified agar and carrageen gums which, upon addition to water at room temperature, form gels, i.e., dissolve to produce a colloidal solution which on standing for a short period of time forms excellent gels. Hence, the modified agar and carrageen gums of this invention are eminently satisfactory for use as stabilizers for icings and wherever an agar or carrageen gum is desired for producing a satisfactory gel on addition to water at room temperature.

In this specification and claims, parts and percentages are given on a weight basis.

A composition intended for use as an icing stabilizer is produced by mixing 100 parts of the dried and cooled modified agar or carrageen gum product as described above, from 1 to 5 parts salt; (provided salt is not used as the water-carrier or gelatinizing additive in which case salt is added only if necessary for taste or flavoring purposes); 1 to 5 parts of emulsifier such as mono and di glycerides, sorbitan mono oleate, sorbitan mono stearate, lecithin, etc.; 25 to 3000 parts of cane sugar; 1 to 10 parts of anticaking agent such as starch, calcium carbonate, tri-calcium phosphate, etc.; 2 to 25 parts of coloring agent such as calcium carbonate, titanium dioxide, calcium sulphate, etc., and 1 to 5 parts of a whipping agent such as soy or egg albumen, milk protein, etc., and pulverizing the mixture.

The emulsifier assists in the proper dispersion of any fat which is contained in the icing formulas. The additional cane sugar is added to control the gum strength and hence the uniformity of the icing. The anticaking agent keeps the composition of the mixture free flowing. The color agent is usually employed to give increased whiteness. The whipping agent gives additional volume and lightness to the icing.

The composition we prefer to use as an icing stabilizer is made by mixing 100 parts of the dried and cooled agar or carrageen product as described above with 3.9 parts of salt, 1.3 parts of sorbitan mono oleate and 25 parts of calcium carbonate. The mixture is then pulverized.

The preferred composition described above is mixed with water preferably at room temperature, but if desired at temperatures somewhat above room temperature, e.g., about 110° F., in the proportions of 1 part of said composition to about 2 to about 5 parts water. These proportions may be varied depending upon the particular icing desired. Thus for a roll icing 1 part of dry mixture of said composition is mixed with 2 to 3 parts water. For a cream type icing from 3 to 4 parts of water may be mixed with each part of dry mixture. Chocolate icing is made by mixing 4 to 5 parts of water per part of dry mixture of said preferred composition.

The following examples of icings embodying this invention are given for purposes of illustrating the invention; it will be understood the invention is not limited to these examples.

(1) Flat White Icing: Modified agar is produced by mixing 4 parts agar, 3 parts tapioca flour, 20 parts cane sugar and 150 parts water at room temperature, heated to boiling, then adding 50 parts cane sugar, drying the resultant solution on a drying drum and pulverizing the dried product. To 7 parts of this mixture is added 100 parts of powdered sugar, 16 parts of hot water (110° F.) and ½ part of flavor. The resultant mixture is mixed until smooth and applied while warm.

(2) Cream Icing: In a mixing bowl is placed 5 parts modified gum produced as described above but utilizing carrageen gum instead of agar; 100 parts powdered sugar and 17 parts water at room temperature. This mixture is mixed to smoothness and there is then added 20 parts butter and ½ part flavor. The resultant mixture is creamed by agitation and then applied forming an exceptionally smooth, uniform icing.

(3) Fudge Icing: In a mixing bowl is placed 5 parts modified agar produced as described in connection with Example I, 100 parts powdered sugar, 15 parts cocoa, 5 parts dry milk solids, 15 parts vegetable shortening, ½ part salt and ½ part flavor. The mixture is blended and added to 19 parts water at 110° F. The resultant mixture is mixed until smooth and applied while still warm producing a delectable fudge icing of exceptional smoothness and uniformity Among the more important advantages of the present invention may be mentioned the following:

(1) A saving of time of from 30 to 60 minutes in producing each batch of icing because the modified gum is incorporated in the icing at room temperature or slightly above room temperature and surprisingly goes into proper colloidal suspension almost instantly upon being mixed with water at such temperatures.

(2) Danger of scalding of the operator is eliminated since boiling and handling of hot solutions is eliminated in producing icings in accordance with this invention, when the baker uses a modified agar or carrageen gum, which, as noted, can be dissolved at room temperature.

(3) Greater uniformity between batches of icings results as it is not necessary to boil the modified gum stabilizer and variations due to loss of moisture inherent in such boiling operations are thus eliminated.

(4) Icings made in accordance with this invention have a longer working life than those made with the heretofore conventional gums thus minimizing time lost in remixing icings after accidental production delays. Unused portions of icing can be easily worked into portions of icing produced for use on the following day.

(5) Icings embodying the present invention have a volume ranging from 3.5% to 15% greater than volumes produced by icings made with the same constituents but employing the heretofore conventional unmodified gums.

(6) The texture or smoothness of the icing embodying this invention is markedly superior to heretofore known icings produced with conventional gums. This improvement is readily apparent to the eye or touch not only of experts but also of laymen. The improved texture results in corresponding improvement in the palatability of the icing.

In this specification and claims, parts and percentages are given on a weight basis.

It will be understood that the present invention is not to be restricted to the specific embodiments herein disclosed, otherwise than as defined by the appended claims.

This application is a continuation-in-part of our application, Serial No. 713,284, filed February 5, 1958, now abandoned and assigned to the assignee of our present application.

What is claimed is:

1. An icing containing as its essential constituents water, sugar and a modified gum produced by mixing a gum from the group consisting of agar and carrageen with a water-carrier additive and water in amount of from 30 to 50 parts water per part of gum and from 0.5 to 250 parts of said additive per part of gum, heating the resultant mixture of water, gum and additive to a temperature of at least 170° F. and thereby produce a solution in which the gum is in a state of colloidal dispersion, drying the resultant solution and pulverizing the dried product to produce said modified gum.

2. An icing containing as its essential constituents water, sugar and a modified gum produced by mixing a gum from the group consisting of agar and carrageen with water in amount of from 30 to 50 parts water per part of gum and with an additive from the group consisting of sugar, flour, mixtures of sugar and flour, sodium chloride, sodium citrate, calcium carbonate, calcium sulfate and tri-calcium phosphate, in amounts of from 0.5 to 250 parts of said additive per part of gum, heating the mixture of water, gum and additive to a temperature of at least 170° F. and thereby produce a solution in which the gum is in a state of colloidal dispersion, drying the resultant solution and pulverizing the dried product to produce said modified gum.

3. An icing containing as its essential constituents water, sugar and a modified gum produced by mixing a gum from the group consisting of agar and carrageen with water in amount of from 30 to 50 parts water per part of gum and with 1 to 250 parts of sugar per part of gum, heating the mixture of water, gum and sugar to about its boiling point and thereby produce a solution in which the gum is in a state of colloidal dispersion, drying the resultant solution and pulverizing the dried product.

4. An icing containing as its essential constituents water, sugar and a modified gum produced by mixing a gum from the group consisting of agar and carrageen with water in the proportions of about 4 parts of said gum to 150 parts water, mixing this mixture with about 3 parts of tapioca flour and about 20 parts cane sugar, heating the resultant mixture to boiling, adding to the resultant solution about 50 parts of cane sugar, drying the resultant hot solution and pulverizing the dried product.

5. An icing as defined in claim 4, which contains per 100 parts of modified gum, 1 to 5 parts salt, 1 to 5 parts emulsifier, 25 to 3000 parts cane sugar, 1 to 10 parts anticaking agent, 2 to 25 parts coloring agent and 1 to 5 parts whipping agent.

6. An icing as defined in claim 1, which contains from 2 to 5 parts water per part of the modified gum.

7. An icing as defined in claim 5, which contains from 10 to 15 parts water per 100 parts of the other constituents of said icing.

8. An icing as defined in claim 4, which contains approximately 100 parts powdered sugar and approximately 16 parts of water per 7 parts of said modified gum.

9. An icing as defined in claim 4 containing per 5 parts of said modified gum, 100 parts powdered sugar, 17 parts of water, 20 parts of shortening and 0.5 part of flavor.

10. An icing as defined in claim 4 containing per 5 parts of said modified gum, 100 parts of powdered sugar, 15 parts of cocoa, 5 parts of dried milk solids, 15 parts vegetable shortening, 0.5 part of salt, 0.5 part of flavor and 18 parts of water.

11. A process of producing an icing, comprising mixing a gum from the group consisting of agar and carrageen with a water-carrier additive and water in amount of 30 to 50 parts of water per part of gum and from 0.5 to 250 parts of said additive per part of gum, heating the resultant mixture of water, gum and additive to a temperature of at least 170° F. and thereby produce a solution in which the gum is in a state of colloidal dispersion, drying the resultant solution, pulverizing the dried product, adding to said pulverized product from 10 to 20 parts of powdered sugar per part of said pulverized product and mixing the resultant mixture at a temperature of from room temperature to not exceeding 110° F. with water in amount sufficient to form an icing of the desired consistency.

12. A process of producing an icing, which comprises mixing a gum from the group consisting of agar and carageen with water in the proportions of about 4 parts of said gum to 150 parts of water, adding to this mixture 3 parts of tapioca flour and 20 parts cane sugar, heating the resultant mixture to boiling, adding to the boiling mixture 50 parts of cane sugar, drying the resultant hot mixture, pulverizing the dry product, mixing the pulverized product with powdered sugar and water in the proportions of approximately 10 to 20 parts of powdered sugar per part of said pulverized product and enough water to produce an icing of the desired consistency.

13. A modified gum from the group consisting of agar and carrageen capable of readily forming a gel upon addition to water at a temperature of about 20° C., consisting of said gum and a water-carrier additive intimately mixed with said gum in amount by weight at least equal to half the amount of said gum, said modified gum being produced by mixing said gum and additive with water in amount of from 30 to 50 parts of water per part of gum, and from .5 to 250 parts of additive per part of gum, heating the mixture of water, gum and additive to a temperature of at least 170° F. and thereby produce a solution in which the gum is in a state of colloidal dispersion, drying the resultant solution and pulverizing the dried product.

14. A modified gum from the group consisting of agar and carrageen capable of readily forming a gel upon addition to water at a temperature of about 20° C., consisting of said gum and a water-carrier additive intimately mixed with said gum in amount by weight at least equal to half the amount of said gum, said modified gum being produced by mixing said gum and additive with water in amount of from 30 to 50 parts of water per part of gum, and from .5 to 250 parts of additive per part of gum, heating the mixture of water, gum and additive to a temperature of at least 170° F. and thereby produce a solution in which the gum is in a state of colloidal dispersion, drying the resultant colloidal solution and pulverizing the dried product, and said additive being from the group consisting of sugar, flour, mixture of sugar and flour, sodium chloride, sodium citrate, calcium carbonate, calcium sulphate and tri-calcium phosphate.

15. A modified gum from the group consisting of agar and carrageen, capable of readily forming a gel upon addition to water at a temperature of about 20° C., consisting of said gum and sugar intimately mixed with said gum in amount by weight approximately equal to 25 parts of sugar per part of said gum, said modified gum being produced by mixing said gum and sugar with water in amount of from 30 to 50 parts of water per part of gum, and about 25 parts of sugar per part of gum, heating the mixture of water, gum and sugar to about its boiling point and thereby produce a solution in which the gum is in a state of colloidal dispersion, drying the resultant solution and pulverizing the dried product.

16. A modified gum from the group consisting of agar and carrageen, capable of readily forming a gel upon addition to water at a temperature of about 20° C., consisting of said gum and a water-carrier additive salt intimately mixed with said gum in amount by weight approximately equal to from 10 to 25 parts of the salt per part of said gum, said modified gum being produced by mixing said gum and said salt with water in amount of from 30 to 50 parts of water per part of gum, and about from 10 to 25 parts of salt per part of gum, heating the mixture of water, gum and additive to about its boiling point and thereby produce a solution in which the gum is in a state of colloidal dispersion, drying the resultant solution and pulverizing the dried product.

17. A process of producing a modified gum from the group consisting of agar and carrageen, which modified gum is capable of readily forming a gel upon addition to water at a temperature of about 20° C., which process comprises mixing said gum with water and a water-carrier additive in amount of from 30 to 50 parts water and .5 to 250 parts of said additive per part of gum, heating the resultant mixture to a temperature of from 170° to 350° F. for from 10 seconds to 18 hours and thereby produce a colloidal solution of the gum in water, employing shorter heating times within said range when heating at higher temperatures, and longer heating times within said range when heating at lower temperatures, drying the resultant colloidal solution to a moisture content of less than 1% and pulverizing the dried product.

18. A process as defined in claim 17 in which the additive is from the group consisting of sugar, flour, mixture of sugar and flour, sodium chloride, sodium citrate, calcium carbonate, calcium sulphate and tricalcium phosphate.

19. A process of producing a modified gum from the group consisting of agar and carrageen, which process comprises mixing approximately 50 parts of sugar with 1 part of said gum and from 30 to 50 parts of water, heating the resultant mixture for about 1 minute at approximately its boiling point, to produce a colloidal solution of said gum in water, drying the solution to a moisture content of less than 1%, cooling the dried product and pulverizing the cooled product.

20. A process of producing a modified gum from the group consisting of agar and carrageen, which process comprises mixing approximately 25 parts of flour with 1 part of said gum and from 30 to 50 parts of water, heating the resultant mixture for about 1 minute at approximately its boiling point, to produce a colloidal solution of the gum in water, drying the solution to a moisture content of less than 1%, cooling the dried product and pulverizing the cooled product.

21. A process of producing a modified gum from the group consisting of agar and carrageen, which process comprises mixing approximately 25 parts sugar and 25 parts flour with 1 part of said gum and from 30 to 50 parts of water, heating the resultant mixture for about 1 minute at approximately its boiling point, to produce a colloidal solution of the gum in water, drying the solution to a moisture content of less than 1%, cooling the dried product and pulverizing the cooled product.

22. A process of producing a modified gum from the group consisting of agar and carrageen, which process comprises mixing about 10 parts of sodium chloride with 1 part of said gum and from 30 to 50 parts of water, heating the resultant mixture for about 1 minute at approximately its boiling point, to produce a colloidal solution of the gum in water, drying the solution to a moisture content of less than 1%, cooling the dried product and pulverizing the cooled product.

23. A process of producing a modified gum from the group consisting of agar and carrageen, which process comprises mixing about 25 parts of a water-carrier additive salt, with 1 part of said gum and from 30 to 50 parts of water, heating the resultant mixture for about 1 minute at approximately its boiling point, to produce a colloidal solution of the gum in water, drying the solution to a moisture content of less than 1%, cooling the dried product and pulverizing the cooled product.

References Cited in the file of this patent

UNITED STATES PATENTS

| | | |
|---|---|---|
| 93,477 | Rand | Aug. 10, 1869 |
| 1,453,843 | Matsuoka | May 1, 1923 |
| 2,474,019 | Steiner et al. | June 21, 1949 |